UNITED STATES PATENT OFFICE.

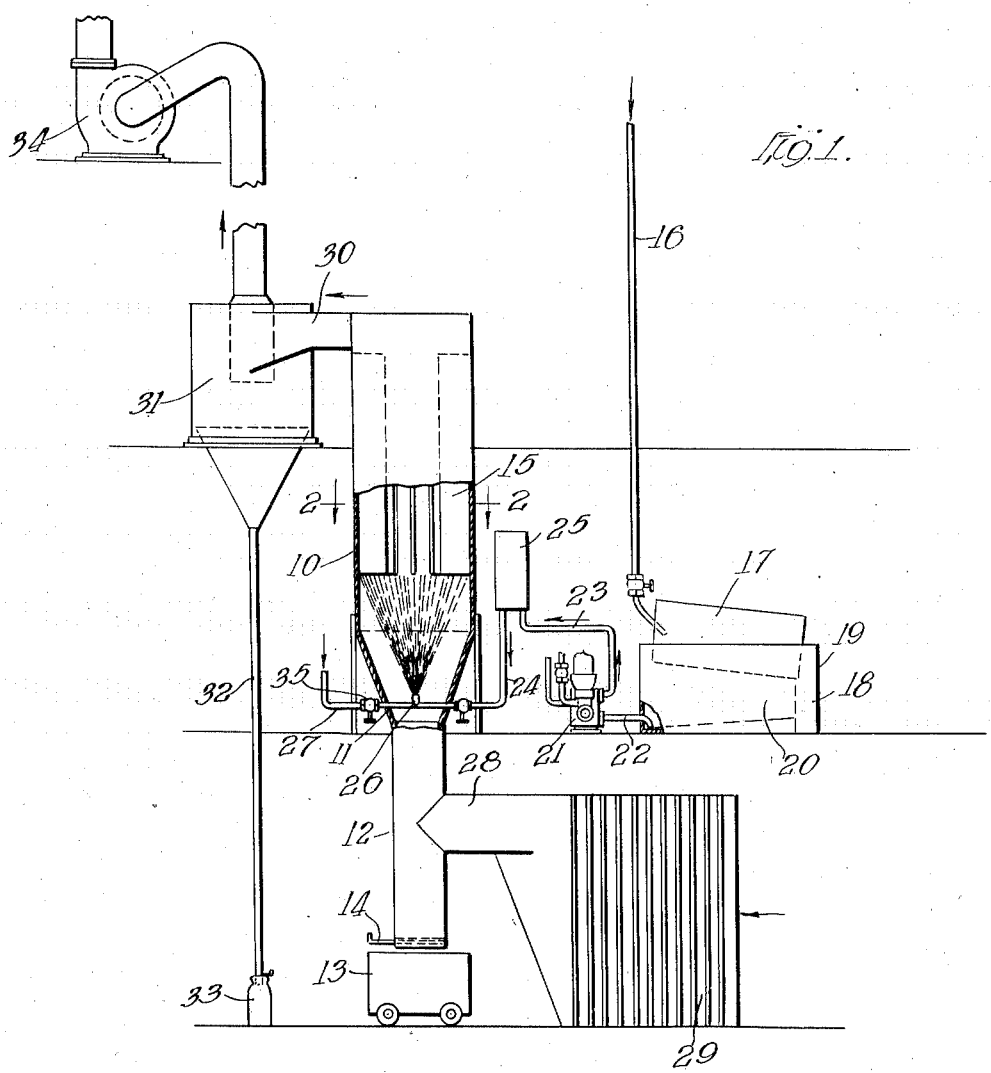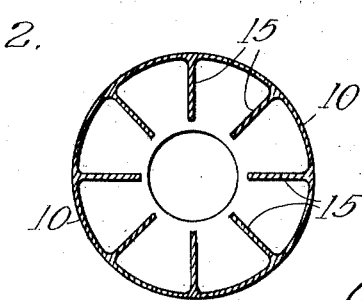

RICHARD G. BRINDLE AND AMOS H. FLINT, OF CHICAGO, ILLINOIS, ASSIGNORS TO CORN PRODUCTS REFINING COMPANY, A CORPORATION OF NEW JERSEY.

METHOD OF AND APPARATUS FOR EVAPORATING LIQUID OR SEMILIQUID SUBSTANCES.

1,415,783.  Specification of Letters Patent.  Patented May 9, 1922.

Application filed July 3, 1918. Serial No. 243,246.

*To all whom it may concern:*

Be it known that we, RICHARD G. BRINDLE and AMOS H. FLINT, citizens of the United States, residing at Chicago, in the county of Cook and State of Illinois, have invented certain new and useful Improvements in Methods of and Apparatus for Evaporating Liquid or Semiliquid Substances, of which the following is a specification.

Our invention relates to the evaporation of liquid or semi-liquid substances, more particularly solutions such, for example, as the liquor obtained from the steep tanks in the corn starch industry, glucose, grape sugar, syrup, or mixtures of glucose and grape sugar with cane syrup, although the invention is not to be considered as limited to these particular substances.

The primary object of the invention is to provide a novel method of and suitable apparatus for reducing substances of this character to a dry state, and particularly for producing an evaporation which will leave the substance not in the form of a fine powder but in the form of a spongy, friable solid or in lumps having these characteristics, mixed, possibly, with a certain amount of powder. Certain substances, when dried to a powder, are very hygroscopic so that the powder when exposed to the atmosphere will become an extremely dense solid which may require grinding before it can be used. Moreover, these substances, because of their hygroscopicity, if in the form of a fine powder, must be handled with care or spontaneous combustion will take place. The tendency of such substances, for example dried steep water, to harden is very much reduced if the evaporation is carried on in such manner as to leave the product in the spongy, friable form which our invention more particularly contemplates.

A suitable apparatus embodying and exemplifying the principles of our invention is shown in the accompanying drawing, wherein Fig. 1 is a diagrammatic view, partly in section, of the apparatus, and Fig. 2 is a cross sectional view on line 2—2 of Fig. 1.

Referring to the drawing, 10 is the evaporating chamber having preferably a conical bottom 11 terminating in a chute 12 through which the dry material is delivered to the receptacle 13 or other suitable depository the bottom of the chute being preferably provided with a valve 14. The drying chamber is formed with a plurality of collecting surfaces against which the liquid or semiliquid substance is directed, preferably in the form of a spray. Preferably these surfaces are provided by forming with the chamber a series of vertical, radially arranged, interiorly projecting webs 15. The material to be treated may be first concentrated in vacuum pans (not shown) or otherwise, and is thereafter preferably run through pipe 16 into a rotary sieve 17 to remove lumps or solid particles of a size to clog the spray nozzle. The tailings are delivered to compartment 18 of the collecting tank 19. The sieved liquor passes into compartment 20 of the tank whence it is forced by means of the pump 21 through pipes 22, 23, 24, (a pressure chamber 25 intervening between pipes 23 and 24,) to a spray nozzle 26 located preferably in the lower or conical end of the evaporating chamber 10. This nozzle may be of any suitable character. The nozzle may be supplied with compressed air through the air pipe 27.

A drying gas, preferably heated air, is introduced into the drying chamber below the spray through pipe 28 and chute 12. We have shown the air as being heated by passing through steam coils 29, but any other method of heating the air might be employed.

The upper end of the drying chamber is connected by pipe 30 with any suitable form of dust collector for removing the residuum of dry material that may be in suspension in the air. We have shown an ordinary form of cyclone dust collector 31 having a discharge pipe 32 to the lower end of which a sack 33 may be attached. Circulation may be produced through the apparatus above described in any suitable manner. We have indicated a suction fan 34 which operates to withdraw the air from the dust collecting device or devices.

The preferred operation of the apparatus is as follows: The substance to be treated is sprayed for a given period in an amount which is relatively large with respect to the amount of the drying gas supplied to the chamber. That is, the liquid or semi-liquid substance is supplied in excess of the capacity of the apparatus to completely evaporate the moisture therefrom. A certain amount of the moisture is evaporated, however, and this reduces the substance to a viscous consistency so that it will adhere in somewhat moist condition to the collecting surfaces. After the material has built up on the collecting surface to a certain extent, the proportion between liquid flow and the flow of the heated air is changed by diminishing the amount of the flow of the liquid to such an extent that the substance being delivered to the collecting surfaces, as well as the moist substance collected thereon during the previous step, will be deprived of its moisture. That is, the apparatus is now operated for a period in such manner that the amount of drying gas supplied will be in excess of that required for drying the liquid delivered to the drying chamber. The material on the collecting surfaces as it dries, will for the most part, fall through the chute 12 into receptacle 13. The powder or dust in suspension in the air is removed therefrom by the dust collector 31.

The control of the liquid supply which is necessary in order that the substance may be subjected to the alternate treatments above described, may be brought about by varying the operation of pump 21 and correspondingly adjusting the valve 35 in the air pipe 27. It will be understood, however, that in these and other respects the apparatus might be very considerably modified without departure from the principles of our invention.

The material which falls from the collecting surfaces of the drying chamber will be in the form of lumps having a porous or spongy consistency, the material being quite friable and the lumps easily broken. It will contain a certain amount of fine powder but not enough to cause any difficulty. The material in this condition will not absorb moisture as readily as will a finely powdered substance. It may be kept indefinitely without caking to any considerable extent. These remarks apply more particularly to the dried steep liquor but the same is true of another substances of the character indicated.

We do not claim herein as a new composition of matter the product formed by the evaporation, in accordance with our method, of the steep water derived from the corn starch industry, nor, specifically, the complete method of manufacturing this fertilizer although this method involves, as a preferred step the drying operation herein described. The fertilizer and the method of manufacturing the same, considered as an entirety, form the subject of our co-pending application Serial No. 243247, filed July 3, 1918.

Our invention does not necessarily contemplate a complete evaporation of all the moisture contained in the substance treated. Ordinarily the product will contain a certain percentage of moisture. By "dryness" we intend dryness in the commercial or ordinary signification of the word.

We claim:

1. A method of evaporating a liquid or semi-liquid substance which consists in subjecting the substance to alternate treatments as follows: First spraying the substance against a collecting surface under conditions which cause the same to adhere thereto, and then bringing a drying gas into contact with the substance collected on said surface to evaporate the moisture from the same sufficiently to destroy its capacity for adhering to said surface.

2. Method of evaporating a liquid or semi-liquid substance which consists in subjecting the substance to alternate treatments as follows: First directing the substance in the form of a spray against a collecting surface together with a draft of a drying gas insufficient in amount to completely evaporate the moisture from said substance, and then changing the proportion of the liquid substance to the drying gas so that the latter will be capable of drying the substance collected on said surface.

3. Method of evaporating a liquid or semi-liquid substance which consists in subjecting the substance to alternate treatments as follows: First directing the substance in the form of a spray against a collecting surface together with a draft of a drying gas insufficient in amount to completely evaporate the moisture from said substance, and then decreasing the amount of the liquid substance delivered to the extent that the drying gas will be sufficient to evaporate the moisture from the substance on the collecting surface.

4. In evaporating apparatus, the combination of a vertically disposed, substantially cylindrical drying chamber having a conical bottom and a discharge chute leading therefrom, a plurality of interior, vertical, radially disposed collecting webs in the drying chamber, an upwardly directed spray nozzle in the conical end of the drying chamber, liquid and air pipes connected with said nozzle, means for delivering heated air to the bottom of the drying chamber, and a suction pump for withdrawing the air at the top of said drying chamber.

RICHARD G. BRINDLE.
AMOS H. FLINT.